(12) United States Patent
Haung

(10) Patent No.: US 6,481,105 B1
(45) Date of Patent: Nov. 19, 2002

(54) PIPE CUTTER

(76) Inventor: Tom Haung, No. 11, Alley 2, Lane 673, Tucheng Rd., Dali City, Taichung (TW)

( * ) Notice: Subject to any disclaimer, the term of this patent is extended or adjusted under 35 U.S.C. 154(b) by 35 days.

(21) Appl. No.: 09/632,781

(22) Filed: Aug. 4, 2000

(51) Int. Cl.$^7$ .............................. B26D 3/16; B23D 21/06
(52) U.S. Cl. ................................. 30/98; 30/99; 30/101; 30/102; 81/57.39; 81/61
(58) Field of Search .......................... 30/101, 102, 98, 30/94; 81/121.1, 60, 57.39, 61, 62, 63, 63.1, 63.2

(56) References Cited

U.S. PATENT DOCUMENTS

| | | | | |
|---|---|---|---|---|
| 619,193 A | * | 2/1899 | Lemley | 81/61 |
| 882,432 A | * | 3/1908 | Thomas | 30/101 X |
| 1,507,969 A | * | 9/1924 | Kilgour, Jr. | 30/101 X |
| 2,007,122 A | * | 7/1935 | Briegel | 30/102 |
| 2,379,177 A | * | 6/1945 | Pavey | 30/101 X |
| 2,447,371 A | * | 8/1948 | Sipsma et al. | 30/101 X |
| 2,633,044 A | * | 3/1953 | Pasquariello | 81/60 X |
| 2,782,500 A | * | 2/1957 | Kelley | 30/99 |
| 2,817,257 A | * | 12/1957 | Kniser | 81/57.39 |
| 3,286,560 A | * | 11/1966 | Murray | 81/58.1 |
| 3,715,804 A | * | 2/1973 | Kelley | 30/99 |
| 3,726,161 A | * | 4/1973 | Williams et al. | 81/60 |
| 4,177,557 A | * | 12/1979 | Courty | 30/102 |
| 5,475,924 A | * | 12/1995 | McDaniel | 30/102 |
| 5,836,079 A | * | 11/1998 | Cronin et al. | 30/101 |
| 6,237,449 B1 | * | 5/2001 | Orlosky | 30/101 X |

FOREIGN PATENT DOCUMENTS

JP 358181513 A * 10/1983 .............. 30/98

* cited by examiner

Primary Examiner—M. Rachuba
Assistant Examiner—Jason Prone
(74) Attorney, Agent, or Firm—Troxell Law Office PLLC

(57) ABSTRACT

A pipe cutter includes a handle, a power-forcing handle, a position recovery member, a drive device, a revolving member, and a cutter device combined together. The handle and the power-forcing handle are pivotally combined together, and pressing the power-forcing handle toward the handle to force the drive device to revolve the revolving member and the cutter device to cut off a pipe placed in the revolving member. The pipe cutter is easy to handle by only pressing the power-forcing handle in cutting a pipe.

7 Claims, 7 Drawing Sheets

PIPE CUTTER

BACKGROUND OF THE INVENTION

This invention relates to a pipe cutter, particularly to one convenient and smooth to handle, and easy to use as well.

Conventional pipe cutters generally includes a handle for a hand to grip and forcing power, a cutter and a roller unit provided to face against each other at an upper end of the handle. The cutter is moved by a functional revolving shaft to move axially toward the roller unit, shortening the gap between the cutter and the roller unit and producing cutting force against the outer circular surface of a pipe. Further, the handle is move around, with the cutter also moving around the outer circular surface of a pipe to gradually cut off the pipe. However, in using the conventional pipe cutter, the pipe cutter has to move around a pipe to be cut, not ideal to handle.

SUMMARY OF THE INVENTION

The objective of the invention is to offer a pipe cutter having a handle and a pressing handle inserting pivotally with each other, a revolving member, a drive device, and a cutter device moving with the drive device around a pipe for cutting it, having convenience in handling.

BRIEF DESCRIPTION OF DRAWINGS

This invention will be better understood be referring to the accompanying drawings, wherein.

DETAILED DESCRIPTION OF THE PREFERRED EMBODIMENT

Figure 1:
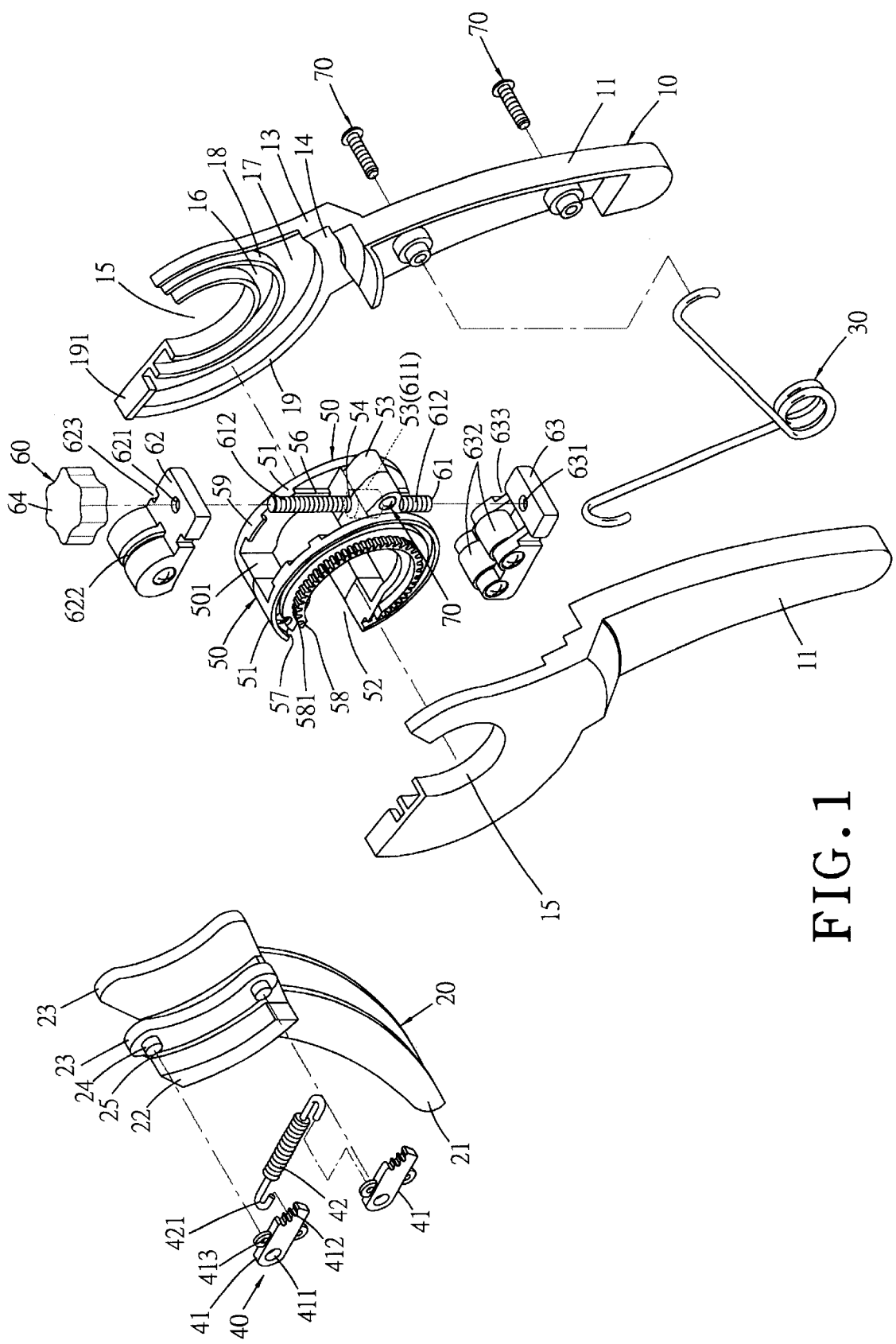
FIG. 1 is an exploded perspective view of a pipe cutter in the present invention.
Figure 2:
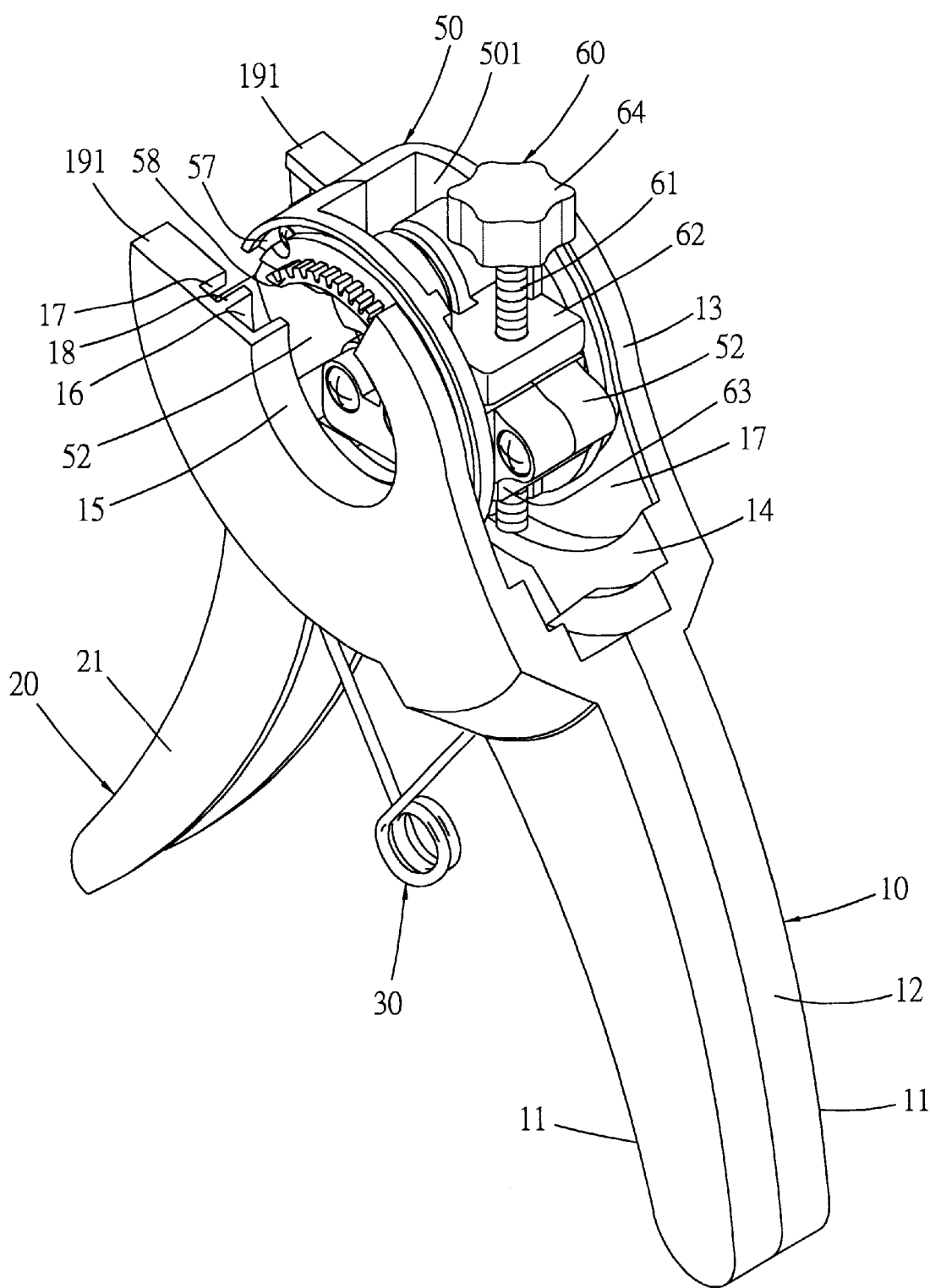
FIG. 2 is a perspective view of the pipe cutter in the present invention.

A preferred embodiment of a pipe cutter in the present invention, as shown in FIGS. 1 and 2, includes a handle 10, a pressing handle 20, a position recovery member 30, a drive device 40, a revolving member 50, a cutter device 60 and a plurality of screws 70 as main components.

The handle 10 consists of two half-handle bodies 11 secured together with screws 70, having a grip member 12 formed in a lower portion, and a pinch pivotal member 13 formed in an upper portion. A pinch pivotal space 14 is formed in the middle of the pinch pivotal member 13, a pipe space 15 formed nearly in the intermediate portion of the two sides of the pinch pivotal space 14, an inner insert pivotal groove 16 and an outer insert pivotal groove 17 formed in a wall defining said pipe space 15 and having the same center with the pipe space 15, an inner guide rail 18 defining the inner insert pivotal groove 16 and an outer guide rail 19 defining the outer pivotal groove 17. A flat stop wall 191 is formed at an upper end of the outer guide rail 19.

The pressing handle 20 has a pressing section 21 of a curved shape formed in a lower portion, a pair of opposite insert slide blocks 22 formed in an upper portion inserting in an outer surface of the pinch pivotal member 13 and moving along the curvature of the outer surface. Further, two parallel insert pivotal plates 23 formed symmetrically inside the two insert slide blocks 22 and each having two pivots 24 formed at two ends of its inner side, and a pair of recessed gap 25 formed between the insert slide blocks 22 and the insert pivotal plates 23 to slide on the outer guide rail 19 of the handle 10. The two insert pivotal plates 23 fit pivotally in the outer insert groove 17 of the handle 10.

The position recovery member 30 is a twist spring in the embodiment, having two ends elastically hooking the grip member 11 of the handle and the pressing section 21 of the pressing handle 20 so as to elastically return the pressing handle 20 back automatically after the pressing handle is moved toward the handle 10.

Figure 3:
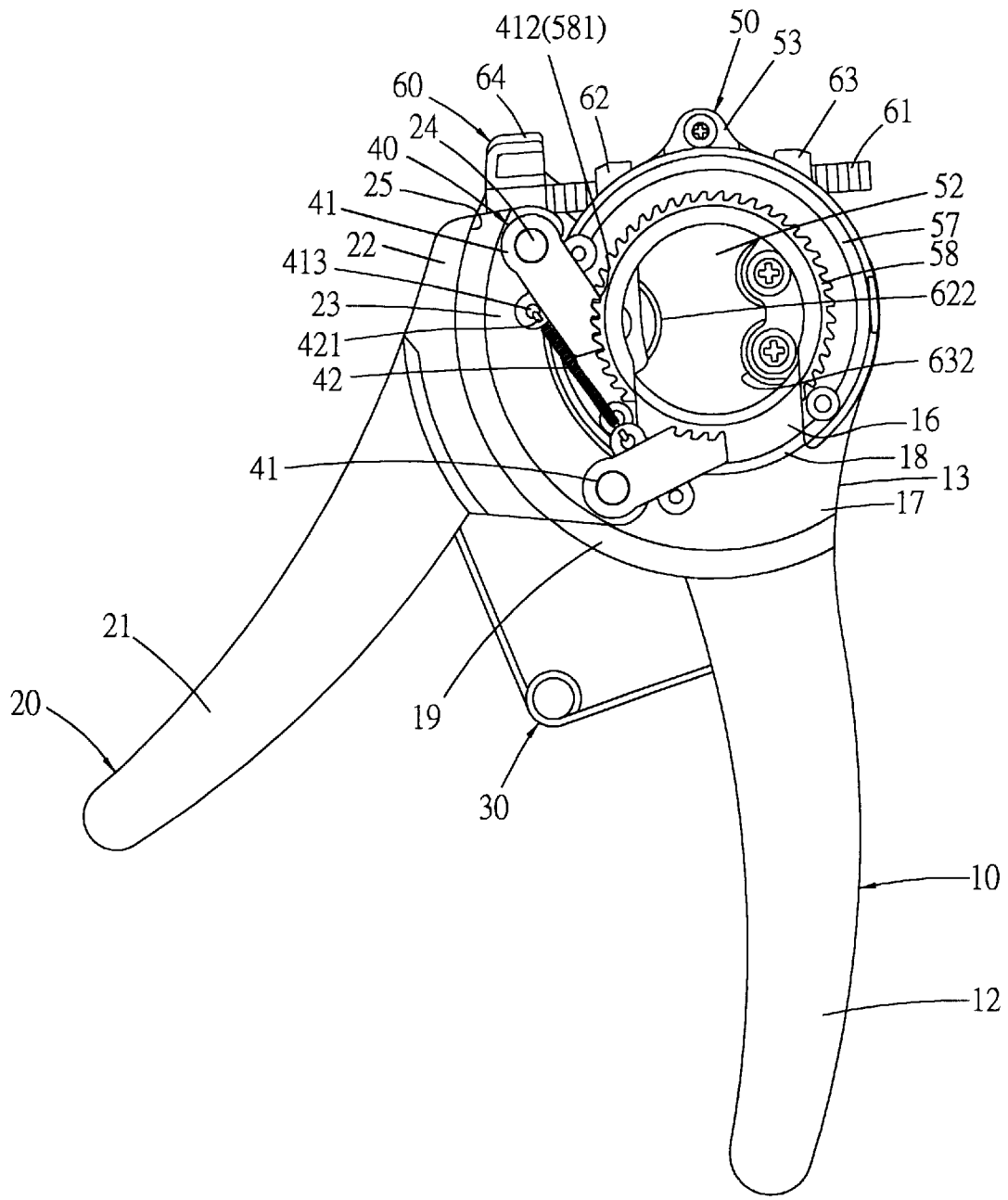
FIG. 3 is a side view of the relative position of a drive device and a revolving member in the present invention.

The drive device 40 as shown in FIG. 3 consists of two drive plates 41 and a coil spring 42. Each drive plate 41 has a pivot hole 411 respectively in one end and engaged the shafts 24 of the insert pivotal plate 23, and plural drive teeth 412 formed on an upper surface of the right end, a hook hole 413 bored respectively on an upper edge and a lower edge of the intermediate portion of each drive plate 41. The coil spring 42 has a hook 421 respectively at two ends hooking the hook holes 413 to pull the drive plates 41. The drive plates 41 are located between the insert pivotal plate 23 and the outer insert groove 17.

Figure 4:
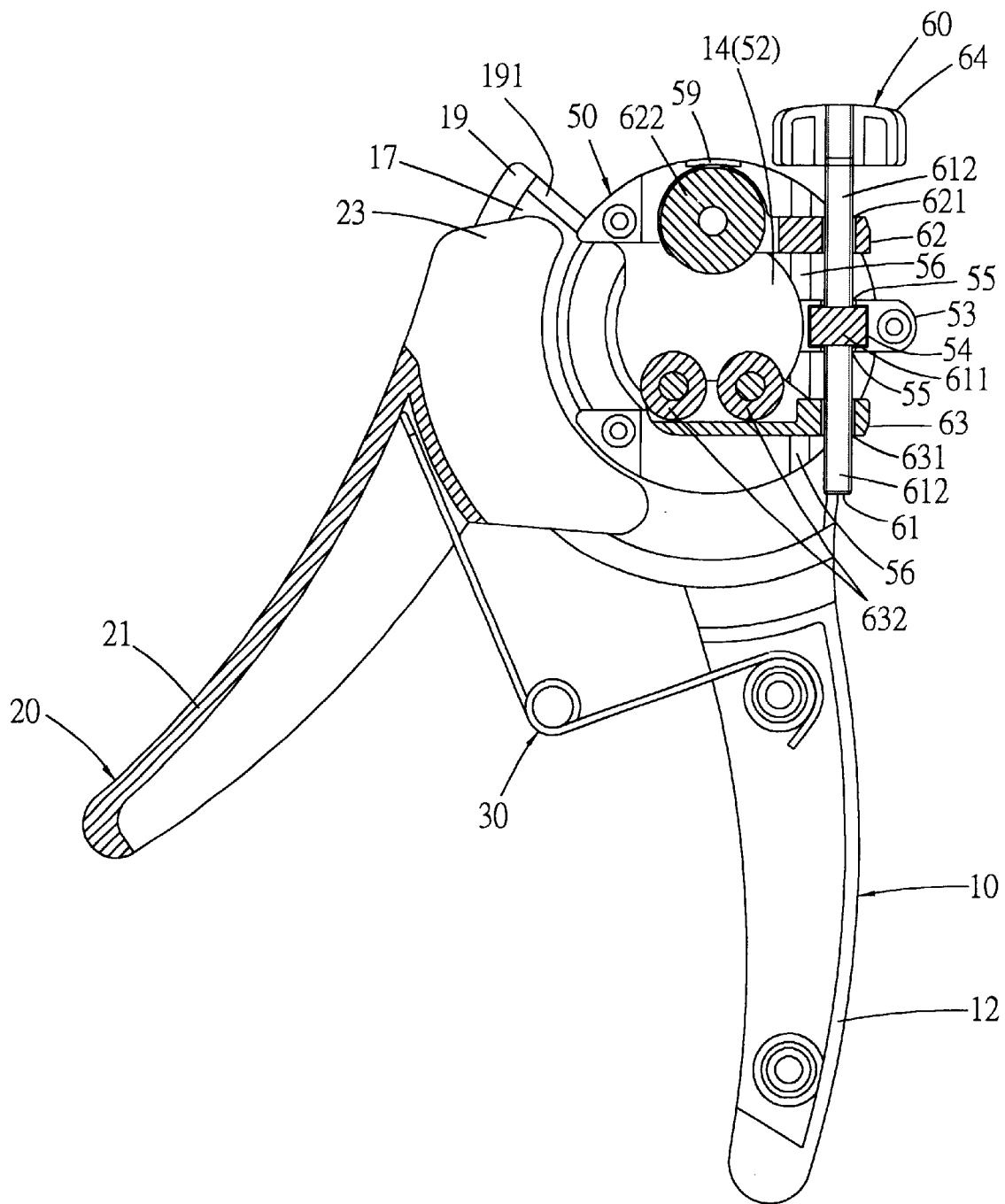
FIG. 4 is a side view of the revolving member combined with a cutter device in the present invention.

The revolving member 50 as shown in FIG. 4 is combined in the pinch pivotal space 14 of the handle 10, and on upper edge of the insert pivotal plate 23 abutting the pressing handle 20. The revolving member 50 consists of two symmetrical revolving discs 51 combined together with screws 70, having a hollow space 501 located lengthwise, a pipe hole 52 with an opening aligned to the same axis of the pipe space 15 of the handle 10. Further, a shaft supporter 53 is formed in an intermediate portion of the opposite side of the opening of the pipe space 52, having a lengthwise pivot hole 54, a vertical small diameter through hole 55 formed to pass through the pivot hole 54, a vertical rail 56 formed near the pivot supporter 53, an annular groove 57 formed around the outer edge of the revolving member 50 to engage the guide rail 18 and the inner insert groove 16 of the handle 10. Further, an annular teeth rail 58 is formed to protrude from the wall defining the annular groove 57, having a plurality of function teeth 581 of the same slope to engage and moved by the drive teeth 412 of the two drive plates 41.

The cutter device 60 consists of a feeding threaded rod 61, a cutter base 62, and a roller base 63. The feeding threaded rod 61 has a pivot shaft 611 of a large diameter fixed on an intermediate portion, and the pivot shaft 611 is placed in the pivot hole 54 of the revolving member 50 when two half revolving discs 51 are combined together, confined in the pivot hole 54. The upper threaded portion 612 and a lower threaded portion 612 are contrary to each other, in other words, one being left threads and the other right threads.

The cutter base 62 and the roller base 63 have respectively a threaded hole 621, 631 separately screwing with the two threaded portions 612. A cutter 622 is pivotally fixed on the cutter base 62, facing the two rollers 632 pivotally connected on the roller base 63. The cutter base 62 and the roller base 63 have respectively a rail hole 623, 633 aligned to each other, fitting and sliding on the rail 56 in a limited distance.

At the top of the feeding threaded rod 61 a revolving button 64 is fixed for turning the rod 61.

Figure 5:
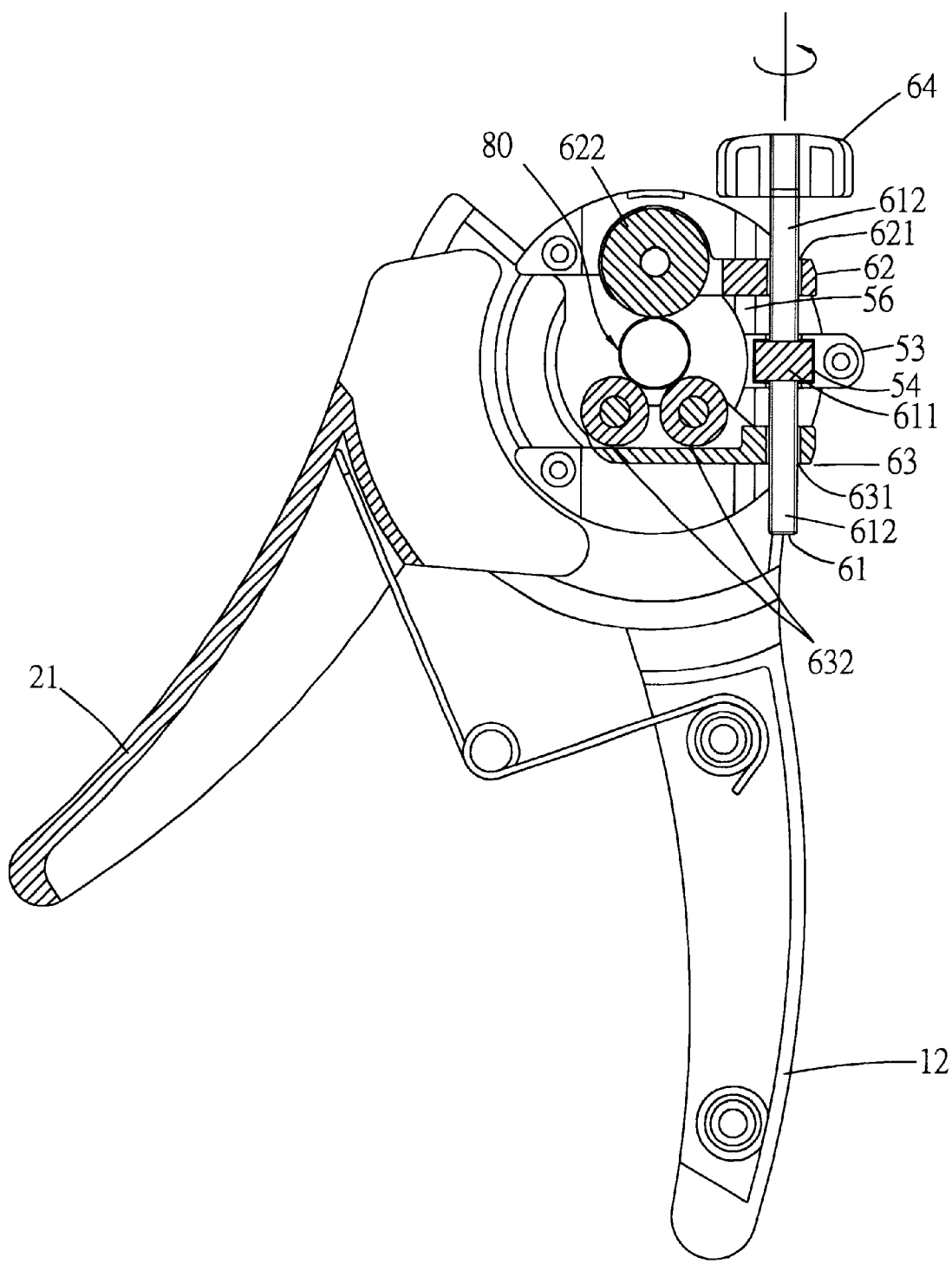
FIG. 5 is a side view of the cutter device pinching a pipe to be cut in the present invention.
Figure 6:
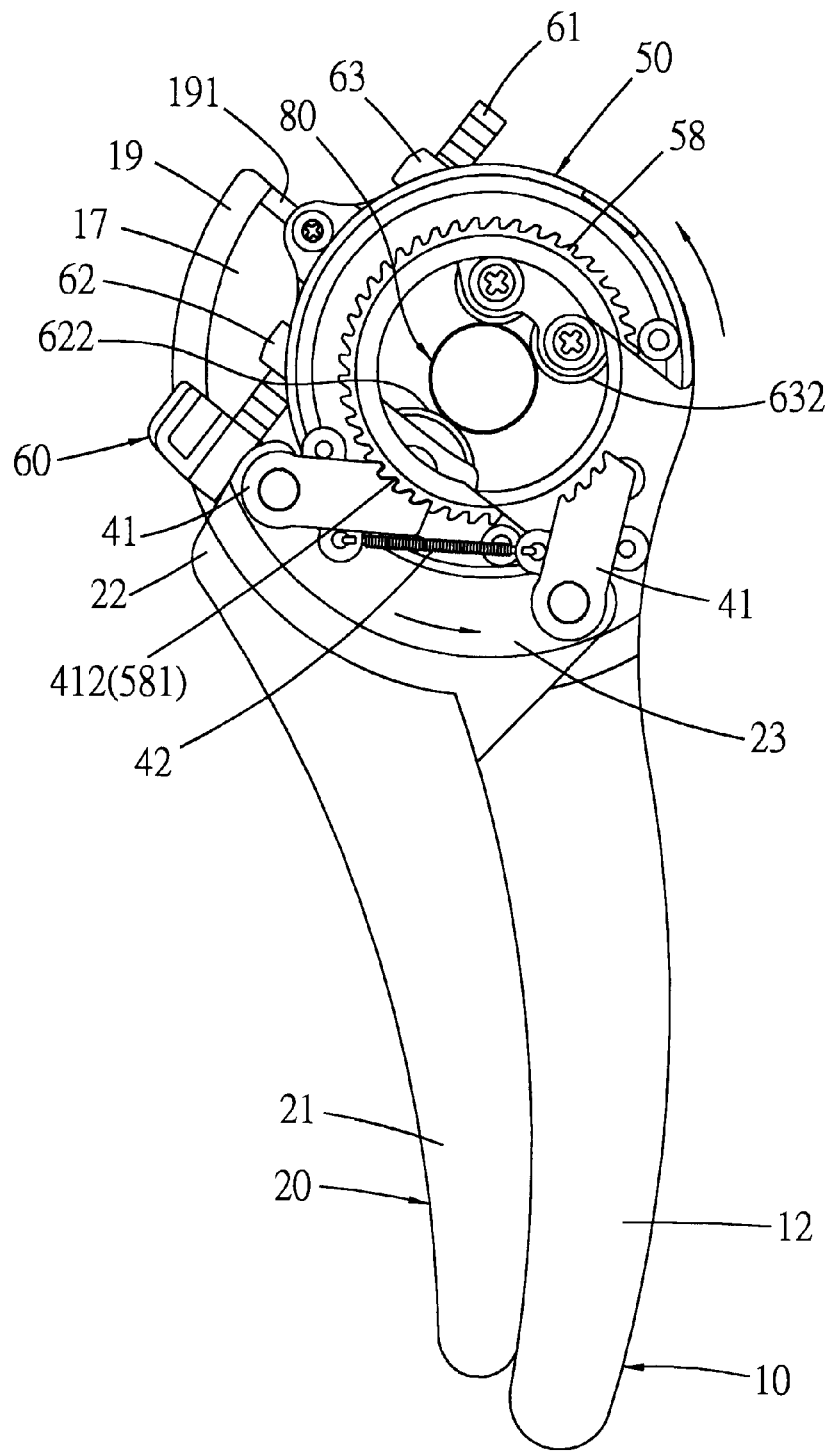
FIG. 6 is a side view of the revolving member revolving in cutting movement around the pipe to be cut in the present invention: and, FIG. 7 is a side view of the relative movement of the drive device and the revolving member in case of the pressing handle returning to its original position in the present invention.
Figure 7:
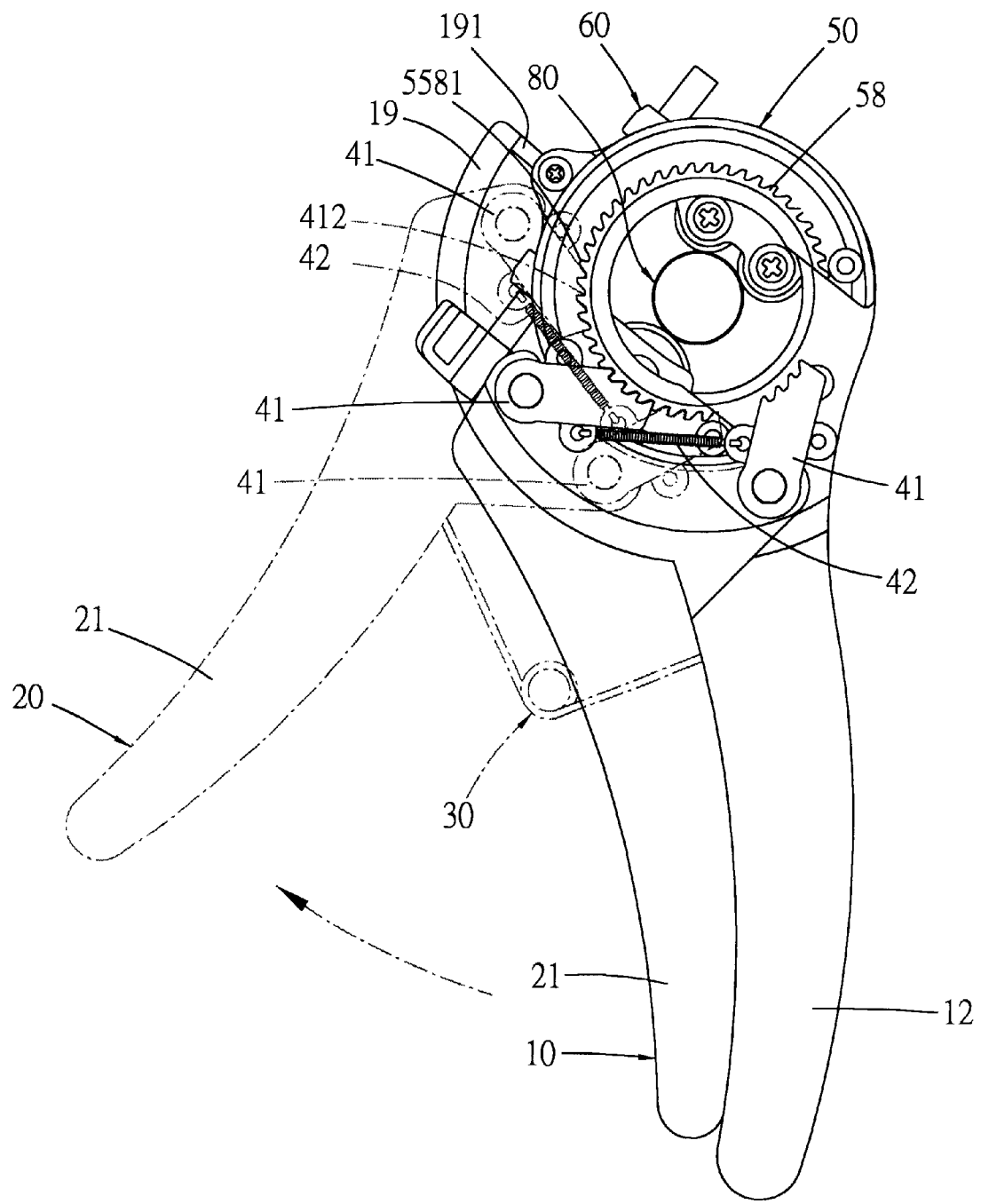

Next, how to handle the pipe cutter is described. Referring to FIGS. 4 and 5, in case that a pipe 80 is to be cut, firstly, the pipe 80 is pushed into the pipe space 15 and the pipe hole 52 of the revolving member 50. The revolving button 54 is rotated to feed threaded rod 61, with the two stages of the threaded portions 612 to move the cutter base 62 and the roller base 63 toward the axis synchronously and tightly press the pipe 80, which is then pinched between the cutter 622 and the two rollers 632. Then the cutter 622 cuts a little into the circular wall of the pipe 80. Next, referring to FIG. 6, when the pipe 80 is completely pinched by the cutter 622 and the rollers 632, begin cutting the pipe 80 by a user gripping the grip member 12 of the handle 10 and pressing section 21 of the pressing handle 20 and press the pressing section 21 toward the grip member 12. At this time the insert slide block 22 of the power-forcing handle 20, the insert pivotal plates 23 and the insert groove 25 all slide along the outer guide rail 19 and the outer insert groove 17 of the pinch section 13 of the handle 10, and the drive device 40 on the insert pivotal plate 23 also move in the same direction, with the drive teeth 412 of the two drive plates 41 engage and move the function teeth 581 of the teeth rail 58 so that the two annular groove 57 may circulate along the inner guide rail 18 and the inner insert groove 16, and the cutter device 60 also circulate to bring the cutter move against and cut the outer surface of the pipe 60 at the same time. Further, referring to FIG. 7, when the power-forcing section 21 moves to touch the grip member 12, the user release pressing the two handles 10 and 20. Then the power-forcing handle 20 may automatically moves back to the original position by resilience of the spring 30, with the drive device 40 also moving back and with the drive teeth 412 of the drive plates 41 disengage from the functional teeth 581. But the revolving member 50 does not move together even if the power-forcing handle 20 returns, and the two drive plates 41 are pulled by the coil spring 42, permitting the drive teeth 412 may move to engage the functional teeth 581, facilitating next round of cutting work. Therefore, when a user repeats pressing and releasing the power-forcing section 21, the revolving member may continue to revolve around a pipe 80 until the cutter completely cut off the pipe 80. On the other hand, when the pressing handle returns, the insert groove 25 and the insert pivotal plate 23 are also pushed by the stop wall 191 on the outer guide rail 19.

The teeth rail of the revolving member 50 is shaped according to the opening of the pipe hole 52 shaped as an incomplete circle, so at least one of the two drive plates 41 of the drive device 40 drive teeth 412 engage and move the teeth rail 571 to obtain smoothness of operation when the revolving member 50 is revolving.

As described above, the cutter base 62 and the roller base 63 are moved by the rotation of the feeding threaded rod 61, utilizing the two contrary direction threads 612 to rotate the cutter base 62 and the roller base 63 in the opposite direction synchronously so that pinching and cutting process of a pipe 80 can be performed fast and effectively. Further, the two stop walls 59 provided at two sides of the top edge of the hollow space 501 is just located at the upper edge of the cutter base 62 to limit the maximum moving distance, preventing them from falling off, should handling process be too excessive.

Finally, it is worth to mention that cutting is performed by simple pressing and releasing the two handles to force the cutter device on the revolving member to rotate and cut a pipe, without need of revolving the hole pipe cutter as the conventional one should be. When the cutter device 60 pinches a pipe 80, the cutter base 62 and the roller base 63 rotate in the opposite direction synchronously to cut the pipe 80 quick and effectively.

While the preferred embodiment of the invention has been described above, it will be recognized and understood that various modifications may be made therein and appended claims are intended to cover all such modifications that may fall within the spirit and scope of the invention.

I claim:

1. A pipe cutter comprising:

a handle having a grip section in a lower end portion, a pinch pivotal member with a hollow space formed in an upper portion, said hollow space having a pipe hole with an opening, a plurality of arcuate insert pivotal grooves and a plurality of guide rails formed around said pipe hole and having a common center;

a pressing handle pivotally inserted in said pinch pivotal member of said handle, and having a pressing section formed in a lower end portion, two opposite insert slide blocks formed at two sides of an upper portion, two insert pivotal plates formed inside said two insert slide blocks, two opposite insert grooves defined by said two insert slide blocks and said two slide blocks to slide along said guide rails and in said insert pivotal grooves;

a position recovery member located between said handle and said pressing handle, resiliently pushing said pressing handle back to an initial position after being pressed to move nearer to said handle;

a drive device including two drive plates and a coil spring, said two drive plates respectively pivotally connected to pins on said insert pivotal plates and having respectively plural drive teeth formed on upper edges, said coil spring having two ends hooked to said two drive plates to pull said drive plates;

a revolving member pivotally located in the hollow space in said pinch pivotal member of said handle and abutting an upper edge of said insert pivotal plate, a hollow formed on an upper surface, a pipe space with an opening corresponding to said pipe hole of said handle, a hollow shaft supporter formed in a side of said opening, a rail respectively provided abutting upper and lower portions of said hollow shaft supporter, an annular groove formed in an outer spherical edge to fit in said guide rails and said insert grooves, an annular teeth rail formed inside said annular groove facing a side of said drive device having a plurality of sloped teeth engaged with and rotated by said drive teeth of said two drive plates; and, a cutter device including a cutter base and a roller base, said cutter base combined with a feeding threaded rod and located in said hollow of said revolving member and moved up and down by rotation of said feeding threaded rod.

2. The pipe cutter as claimed in claim 1, wherein said handle comprises two half symmetrical handles screwed tightly with screws.

3. The pipe cutter as claimed in claim 1, wherein said revolving member consists of two portions screwed together with screws.

4. The pipe cutter as claimed in claim 1, wherein said position recovery member is a twist spring.

5. The pipe cutter as claimed in claim 1, wherein said position recovery member is a compress spring.

6. The pipe cutter as claimed in claim 1, wherein said coil spring is a lengthening spring.

7. The pipe cutter as claimed in claim 1, wherein said cutter device comprises said feeding threaded rod, said cutter base, and said roller base, said feeding threaded rod having an enlarged diameter pivot in an intermediate portion contained in a pivot supporter of said revolving member, said feeding threaded rod having an upper portion and a lower portion respectively having opposite direction threads; said cutter base and said roller base respectively each having a threaded hole engaging one of said two separate threads of said feeding threaded rod, said cutter base having a cutter pivotally connected so as to face two rollers of said roller base and a rail groove aligned to each other to fit and slide on said rail of said revolving rail; and a rotating button fixed with an upper end of said feeding threaded rod for rotating said rod.

* * * * *